US011519173B2

(12) United States Patent
Hinkle et al.

(10) Patent No.: US 11,519,173 B2
(45) Date of Patent: Dec. 6, 2022

(54) AUTOMATED MEPI DESIGN FOR HOLLOW WALL CONSTRUCTION

(71) Applicant: Global Bamboo Technologies Inc., Windsor, CA (US)

(72) Inventors: William Hinkle, Windsor, CA (US); Zack Zimmerman, Windsor, CA (US)

(73) Assignee: GLOBAL BAMBOO TECHNOLOGIES, INC., Windsor, CA (US)

( * ) Notice: Subject to any disclaimer, the term of this patent is extended or adjusted under 35 U.S.C. 154(b) by 0 days.

(21) Appl. No.: 17/523,106

(22) Filed: Nov. 10, 2021

(65) Prior Publication Data
US 2022/0064952 A1    Mar. 3, 2022

(51) Int. Cl.
*E04C 2/52* (2006.01)
*B26D 5/00* (2006.01)
*G06F 30/13* (2020.01)
*E04C 2/00* (2006.01)

(52) U.S. Cl.
CPC .............. *E04C 2/526* (2013.01); *B26D 5/005* (2013.01); *G06F 30/13* (2020.01); *E04C 2002/005* (2013.01)

(58) Field of Classification Search
CPC .... E04C 2/526; E04C 2002/005; G06F 30/00; G06F 30/13; G06F 30/18; G06F 2113/14; B26D 5/005
USPC .......................................................... 703/1
See application file for complete search history.

(56) References Cited

U.S. PATENT DOCUMENTS

| | | | |
|---|---|---|---|
| 4,918,614 A | 4/1990 | Modarres et al. | |
| 5,669,736 A | 9/1997 | Douglas et al. | |
| 5,740,341 A | 4/1998 | Oota et al. | |
| 7,042,468 B2 | 5/2006 | Schwegler, Jr. et al. | |
| 8,161,697 B1* | 4/2012 | McDonald | E04C 2/16 52/241 |
| 9,477,790 B2 | 10/2016 | Khanzode et al. | |
| 2003/0056452 A1 | 3/2003 | Plsek et al. | |
| 2008/0055554 A1 | 3/2008 | Tubin et al. | |
| 2011/0288672 A1 | 10/2011 | Cunney et al. | |

(Continued)

OTHER PUBLICATIONS

Pilon, Angelique et al., "An Overview of the Construction of a Tall Wood Building: Brock Commons Tallwood House", May 2018, NZ Journal of Forestry, vol. 63., No. 1. (Year: 2018).*

(Continued)

*Primary Examiner* — Cedric Johnson
(74) *Attorney, Agent, or Firm* — Steven A. Nielsen; www.NielsenPatents.com (57) ABSTRACT

Disclosed embodiments include the production of construction plans upon planar surfaces such as studless walls near studless walls or traditional framing. Disclosed embodiments include specialized databases, cutting systems and printing systems useful for implementation of various plans upon planar surfaces sometimes used with hollow wall systems, sometimes constructed with bamboo or other fast growing sources of structural fiber, with the types of subject printing and cutting sometimes including architectural plans, structural plans, electrical plans, plumbing plans, mechanical plans, insulation plans, media plans, security plans and construction plans and details including those derived directly from various plans.

14 Claims, 12 Drawing Sheets

(56) References Cited

U.S. PATENT DOCUMENTS

2015/0186558 A1* 7/2015 Khanzode ............... G06F 30/13
                                                    703/1
2015/0286750 A1   10/2015 Chen et al.
2016/0210377 A1*  7/2016 Bumbalough .......... G06F 30/13

OTHER PUBLICATIONS

Li, Xiaodan et al., "Modular and Offsite Construction of Piping: Current Barriers and Route", May 26, 2017, Applied Science. (Year: 2017).*

* cited by examiner

AUTOMATED MEPI DESIGN FOR HOLLOW WALL CONSTRUCTION

BACKGROUND OF THE INVENTION

(1) Field of the Invention

The invention generally relates to the installation and placement of mechanical, electrical, plumbing, structural components, architectural components, insulation and insulation access voids within panelized wall systems. More particularly, the invention relates to means and methods of analyzing building and architectural plans to produce printing upon studless panel walls, traditional panel walls and other construction components to guide in the placement of construction components.

(2) Description of the Related Art

U.S. Pat. No. 9,477,790 granted to Khanzode et al on Oct. 25, 2016 discloses a computerized system for placing building components within traditional stud wall framing Neither Khanzode, or the other known prior art, provide means or methods for placement of construction components within hollow wall construction or studless wall construction. Thus, there is a shortfall in the art, especially after considering the benefits of hollow wall construction.

The superior qualities of studless load bearing hollow wall systems or other wall systems using hollow assemblies between panels or other types of panels are well documented and discussed in U.S. Pat. No. 8,161,697 (the '697 Patent) issued to McDonald on Apr. 24, 2012.

BRIEF SUMMARY OF THE INVENTION

The disclosed embodiments overcome shortfalls in the related art by presenting an unobvious and unique configuration and use of specialized database systems mapped to unique exterior and interior wall construction configurations, to produce hollow wall construction panels and traditional panels bearing printed placement, specification indicia, and instruction, the printed placement indicia used for the artful placement and attachment of construction components upon the panels. The database(s) comprises but is not limited to one or more of the following: architectural plans, structural plans, electrical plans, plumbing plans, mechanical plans, media and security plans, et cetera, along with residential or commercial building code requirements, parts and inventory listings and more.

Disclosed systems include means and methods of printing a partial, or full, floor plan upon an exposed face of a panel and the printing of indicia upon exposed wall surfaces as well as on the unexposed or cavity surfaces of panels. The printing of relative panel location speeds construction as construction workers are not required to decipher formal construction plans that are often not readily available. The use of hollow wall construction presents new challenges or new opportunities in the efficient placement of interior wall components such that the unexposed or cavity surfaces of panels become useful in component placement. In traditional stud wall construction, the interior surfaces of walls or exterior pieces of plywood are less useful, as studs and/or blocking prevent the seamless horizontal running of pipes, wires and other components. Thus, the presently disclosed embodiments are especially novel in that they enable new construction efficiencies presented by the relatively new art of hollow wall construction.

Disclosed systems overcome shortfalls in the art by providing for the artful placement of access holes used for filling walls with insulation. Disclosed systems calculate void volume within walls such that proper amounts of insulation may be prepared and scheduled.

Disclosed systems further the advances made in hollow wall construction by use of specialized database systems and computer systems wherein constraints of building materials, construction geometry, component interactions, building codes, sequences of construction and other factors influence the placement of component indicia upon panel walls. Disclosed embodiments overcome shortfalls in the art by producing unique outputs that include floor plans, wall sections, panel cut sheets, track plans, instructions, assembly details, composite parts lists and the physical printing of useful markings upon panel surfaces. System outputs include panels marked with component placement indicia that speeds up the construction process and further enables component placement upon interior or cavity surfaces of exterior walls, a location not well utilized in traditional construction.

Disclosed embodiments overcome shortfalls in the art by economically producing panels that are machine cut (CNC) and machine printed, with such printing vitiating the need for construction workers to read and interpret traditional construction plans and/or to cut wood products at the construction site where level and stable cutting tools can be difficult to prepare. The disclosed embodiments help to shorten construction time and reduce labor costs and the need for on-site skilled labor as window, door, electrical and plumbing voids, pre-drilled fastener voids and the panels themselves are cut in a factory using CNC machines run by trained technicians. The panels for an entire building may be printed upon, cut and prepared for shipment in advance of site preparation, thus avoiding delay in onsite construction. Moreover the disclosed panel design, marking and cutting allows for panels to be efficiently stacked and transported to a construction site.

Disclosed embodiment overcome shortfalls in the art by use of database systems, processors and non-transitory storage media to create a pre-plan using predefined databases and then refining the pre-plan by use of user defined databases or accepting input from local engineers, building officials and others to customize both the design and fabrication of the panels to comport with specific construction site conditions and local building rules.

BRIEF DESCRIPTION OF THE DRAWINGS

FIG. 8 depicts a continuation of FIG. 7 with additional cuts in the panel
  100 a disclosed database and computer system in general
  200 initial input of construction data
  220 framing rule database
  240 framing design and plan
  300 subset variables of construction data
  400 preliminary plan output
  410 preliminary framing map
  430 preliminary MEPI Map
  450 conflict check and resolution
  470 counterpart review
  500 final plan output
  510 final framing map
  530 final MEPI map
  550 outputs of final plan output system, in both analog and digital form
  600 printing system
  605 plumbing marking or plumbing indicia
  610 pipe clip or pipe fastener
  700 cavity or unexposed face of outside panel run in dual panel exterior hollow wall construction
  710 exposed face of the inside panel run in a dual panel exterior hollow wall
  715 solid line depicting location of drain line
  717 clip to secure a drain line
  730 solid line showing electrical line to be attached to the exposed face 710 of an exterior or outside panel
  750 window void cut into and defined by an outside panel 700
  760 line or indica for direct attachment of components, i.e. electrical or plumbing up an outside panel
  800 exposed face of inside panel run of dual panel exterior hollow wall construction
  810 exposed side or interior side of interior panel 800
  815 dashed line depicting behind the panel location of drain line
  820 floorplan printed upon a panel depicting the relative location of a panel with respect to other panels
  840 electrical switch or outlet void cut into or defined by an inside panel 800
  850 window void cut into and defined by an inside panel 800
  860 plumbing void, cut into and defined by an inside panel 800
  870 insulation fill void, cut into and defined by an inside panel 800
  880 dashed line or other indicia printed upon an inside panel to note a component disposed within a center void, the center void or hollow wall void defined by an outer panel 700 and an inner panel 800
  900 plumbing component
  1000 blocking component disposed between an outside panel and an inside panel These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The term "hollow wall" construction includes construction that contains one or more traditional framing members or construction components between or near the panel wall systems contemplated by the disclosed embodiments.

The term "studless construction" includes near studless construction that may comprise various construction components between the panels of the disclosed embodiments. The term may also include the use of panel stiffeners that may reach 50 to 100 percent of the panel height.

Figure 1A:
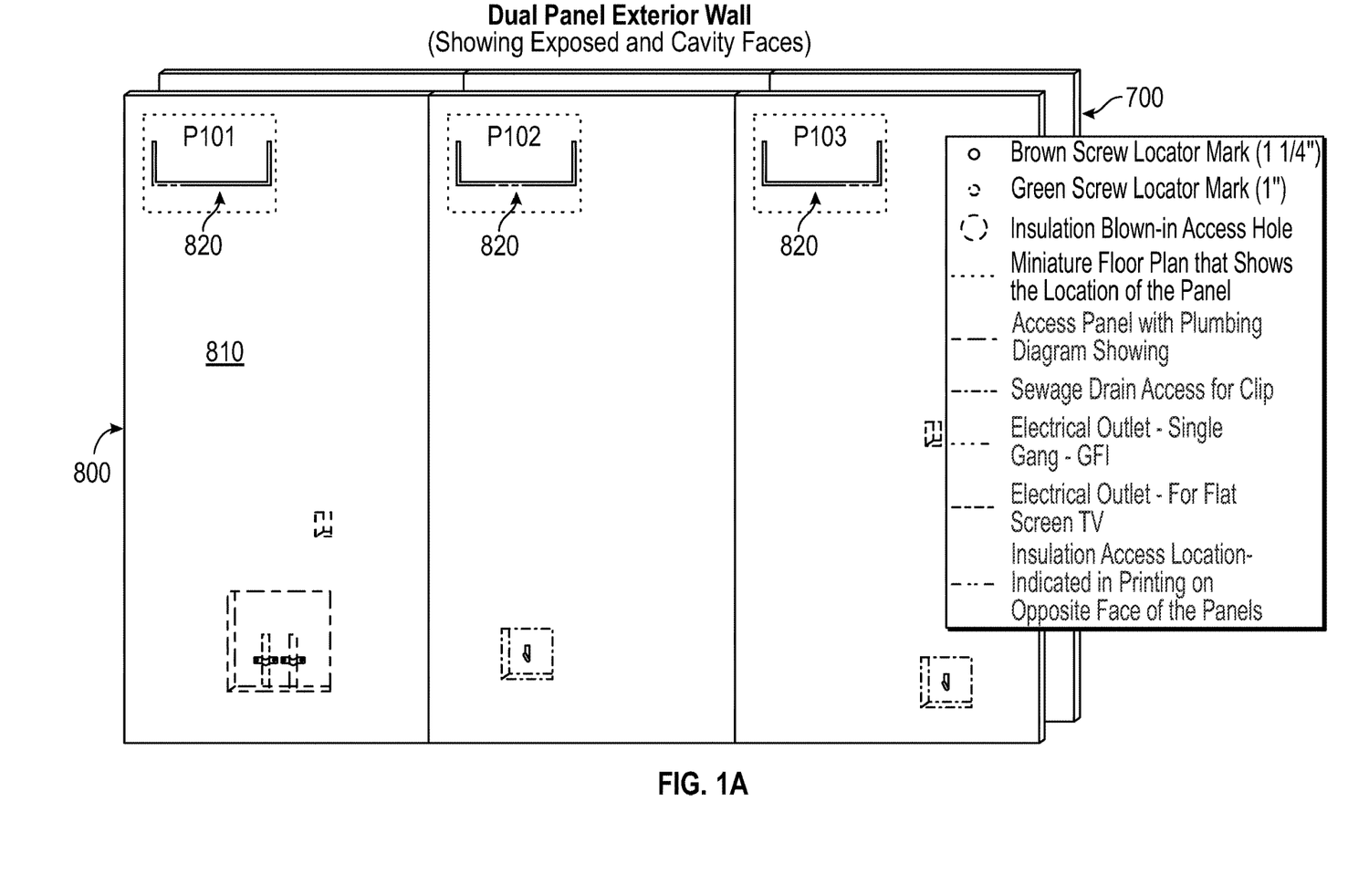
FIG. 1A depicts two parallel panel runs of a dual panel exterior wall

Referring to FIG. 1A, an outside panel run 700 of an exterior wall or panel is shown in the background and behind an inside panel run 800. The inside panel run 800 is shown in the foreground and the exposed face 810 of the inside panel run is shown. The inside surface of the inside panel may feature a miniature floor plan 820 or other plan to assist an assembler in placing the subject panel in the correct location relative to adjacent panels.

Figure 1B:
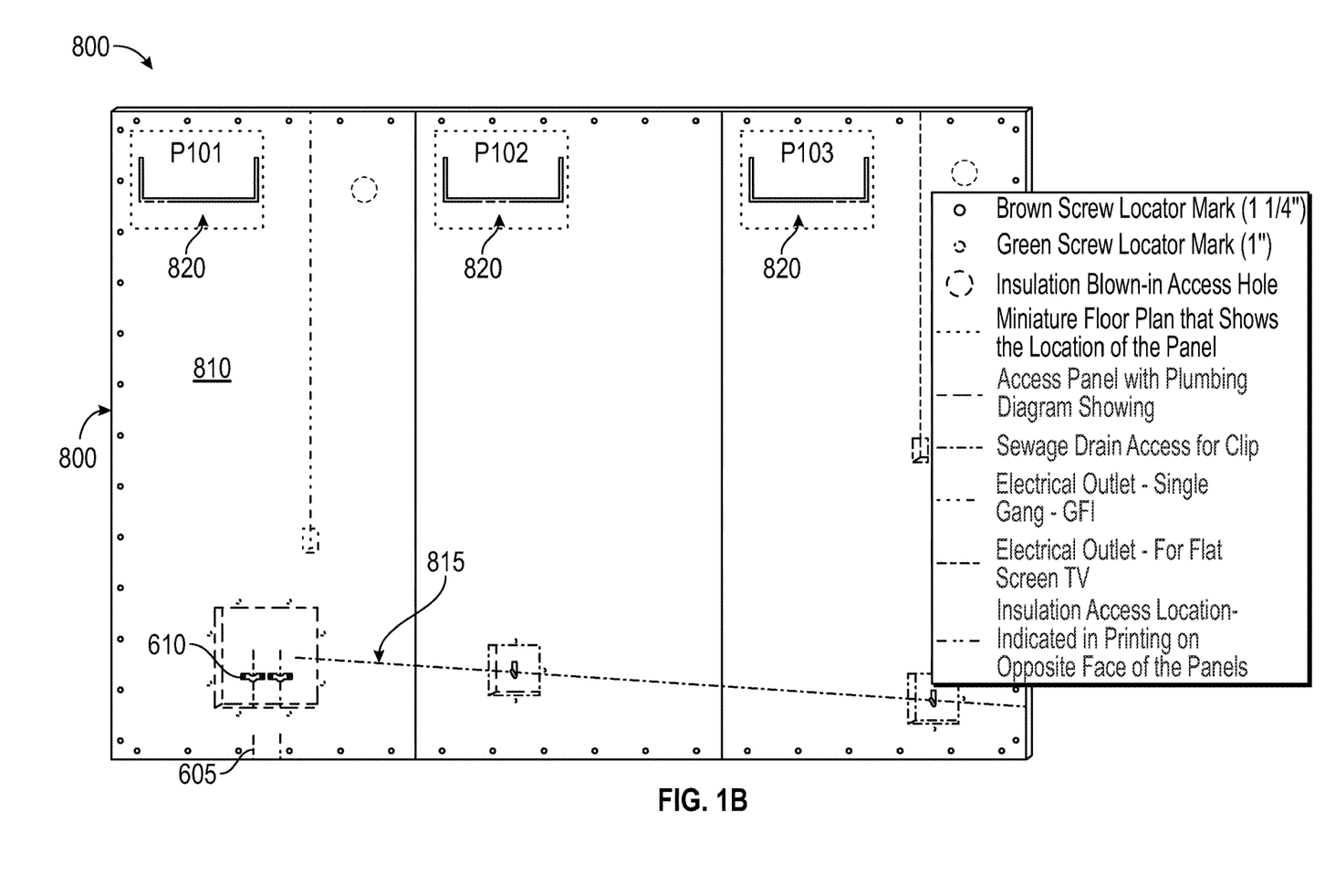
FIG. 1B depicts an enlarged view of the exposed face of the inside panel run of the exterior wall of FIG. 1A

FIG. 1B depicts the exposed side 810 of inside panel run 800. The term "exposed face" may mean the surface of a panel that may be exposed to or seen by an individual when standing in front of the panel or in an interior room of the structure. The term "exposed face" may also mean or be defined as the inside surface of an inside panel. FIG. 1B may also be considered a series of three separate panels or panel sections, P101, P102 and P103 with each panel section depicted upon a floorplan 820 in dashed lines, with the floor plan printed upon each panel section. A floor plan may depict wall sections in general and may depict the relative location of each panel section.

Figure 1C:
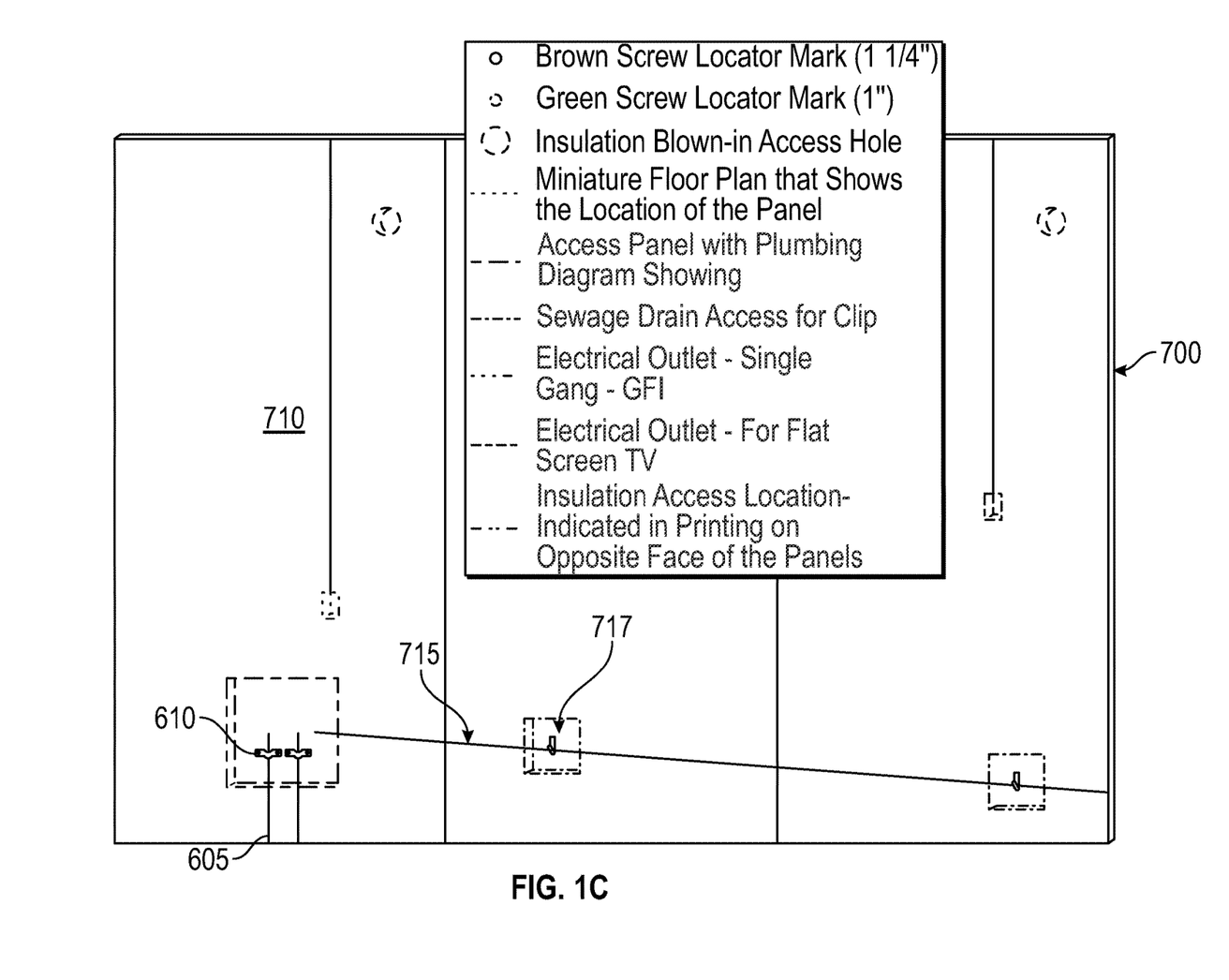
FIG. 1C depicts an enlarged view of an unexposed or cavity face of the outside panel run of the exterior wall of FIG. 1B

FIG. 1B depicts indicia of a pipe 605 and depicts a pipe clip 610 on the cavity side of the opposing outside panel run. Referring to FIG. 1C, the pipe clip 610 is attached to the void side 710 of an outside panel run 700. The term "void side" may mean the side of panel facing the cavity, dark or void space defined by and within an inside panel and an outside panel. The term "outside panel run" or "outside panel" may mean a panel that comprises the outermost element of a dwelling, a panel that may be viewed from the outside of the dwelling.

Referring back to FIG. 1B, indicia comprising a dashed drain line 815 runs in a downward slope crossing several panel sections. This dashed line 815 may be printed upon the exposed side 810 of the inside panel run and/or the dashed line 815 may be printed upon construction plans. The dashed drain line 815 will instruct or confirm the proper placement of a drain line 715 (as shown in FIG. 1C), i.e. the drain line being secured into the cavity face of the outside panel run 700 as shown in FIG. 1C. FIG. 1B also shows fastener positions along the perimeter of the panels by use of circles and such circles may take the form of colored dots or circles drawn with unique dash patterns. The colored dots of fastener indicia may be color coded to map to various types of fasteners to speed construction. Fastener positions may be marked with colored indicia and/or pre-drilled to speed the application of the fasteners. The pre-drilling may be part of the CNC operations discussed below.

Referring to FIG. 1C, a solid drain line 715 is printed upon the cavity side 710 of the outside panel run 700, with the solid drain line or solid drain line indicia used to place the drain line upon the exterior panel. Drain line 715 may also represent an installed drain pipe secured upon or covering the drain line indicia.

The relative placement of panels is show in FIG. 1B at 820. In the prior art, traditional construction plans are often rolled, torn, written in just one language, difficult to interpret and sometimes unavailable, and this invention eliminates the need for non-durable paper. Moreover, the printed analog indicia can provide exact location and specification in the field environment thereby reducing or eliminating mistakes often caused by inexperienced laborers. The factory design, printing and CNC cutting also reduces conflict between code enforcing inspectors and contactors due to misinterpretations of specific plans and building codes generally.

Figure 2A:
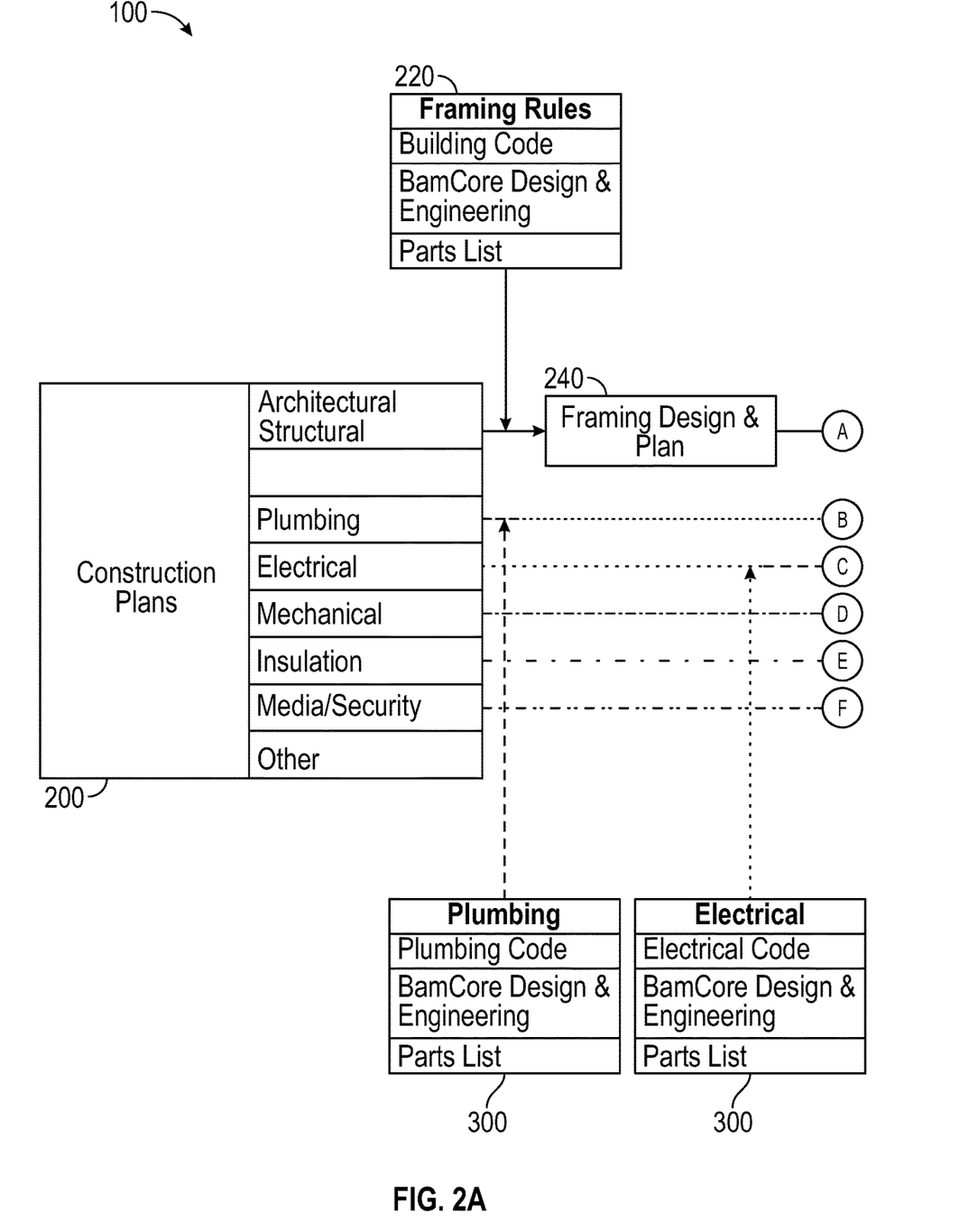
FIG. 2A depicts a flow chart, database, computer and printing system used to produce the disclosed outputs
Figure 2B:
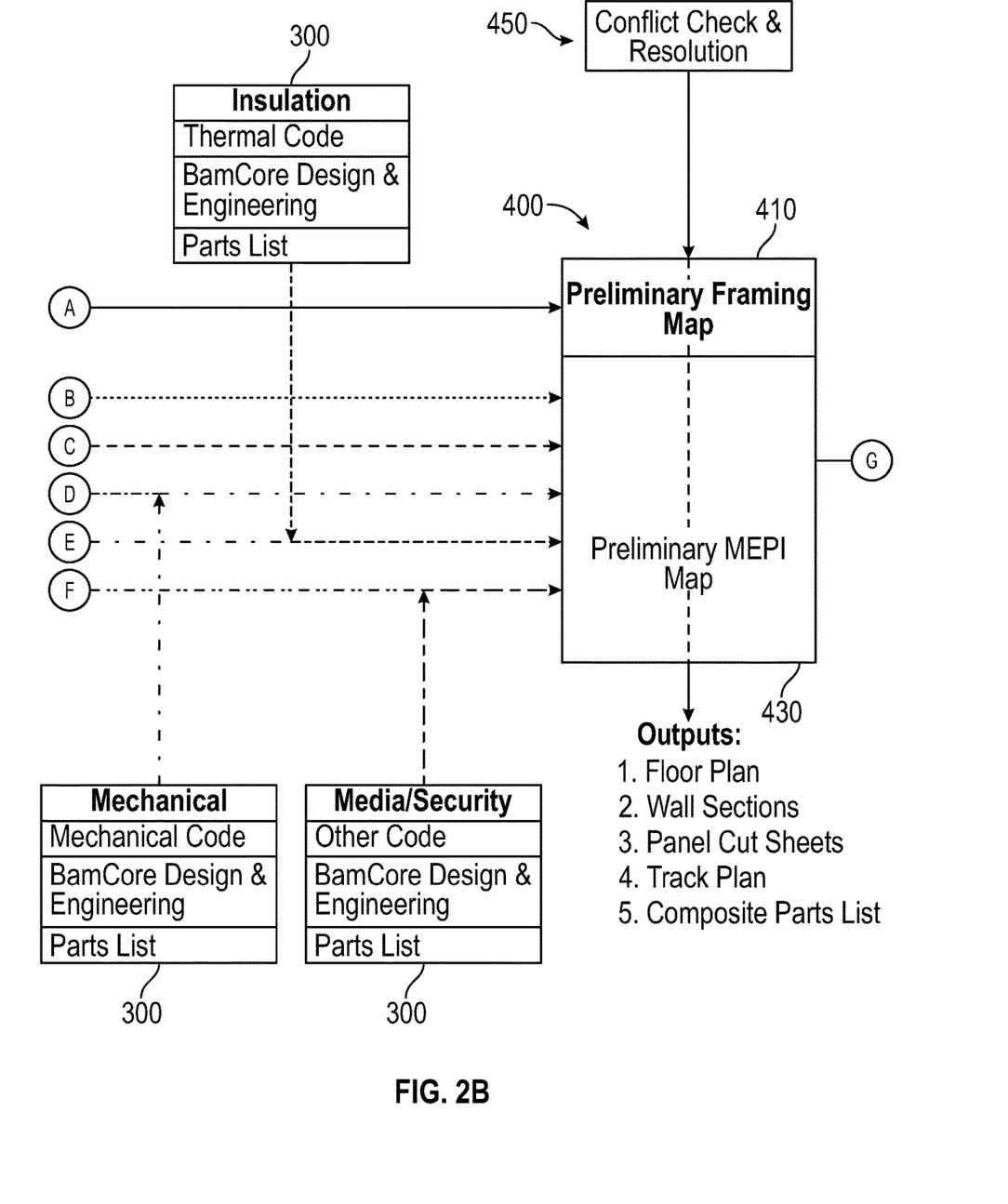
FIG. 2B depicts a continuation of FIG. 2A
Figure 2C:
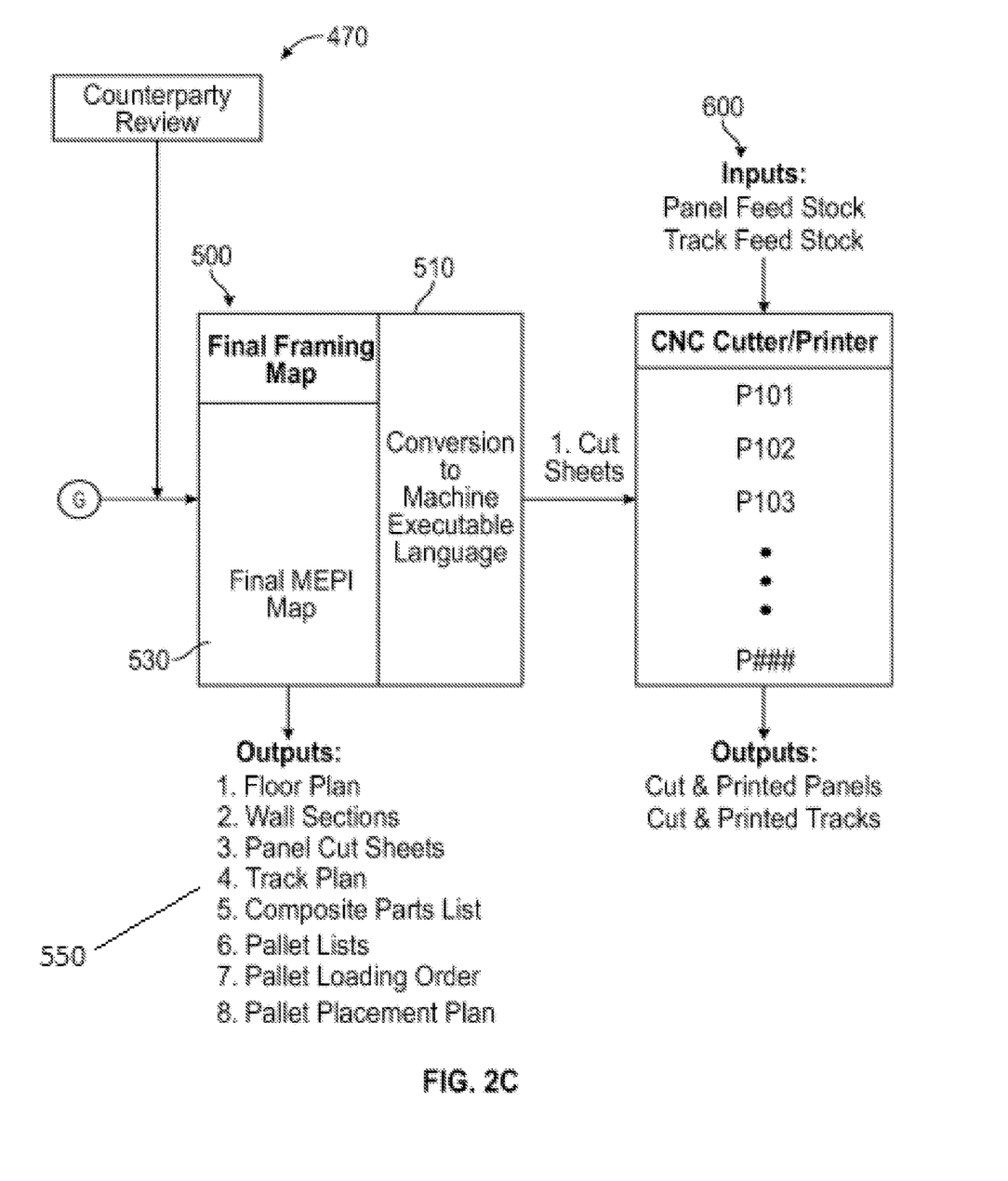
FIG. 2C depicts a continuation of FIG. 2B

Referring to FIG. 2A to 2C a disclosed embodiment 100 comprising a disclosed database, computer and printing system is shown. Initial data inputs 200 may include construction plans, with the construction plans comprising a plurality of component plans, the component plans may include plans for architectural/structural, plumbing, electrical, mechanical insulation, media/security and other components or systems.

An input of framing rules 220 may comprise data pertaining to building codes, design and engineering construction and part lists. A framing design and plan 240 may be produced and result in preliminary plan output pertaining to a preliminary framing map 410.

Detailed component information 300 may also be processed by the system to derive a preliminary Mechanical, Electrical, Plumbing, Insulation (MEPI) Map 430. Preliminary plan output 400 may comprise a preliminary framing map 410 and preliminary a MEPI Map 430. The preliminary plan output 400 may be used in or revised by a conflict check and resolution system 450. After a counterparty review 470, a final plan output 500 may be produced by the system and be used to create outputs 550. Such outputs may include floor, wall, track plans, panel cut sheets, wall sections, composite parts list, pallet lists, pallet loading order and pallet placement plan. An advantage of the disclosed embodiments over the known prior art, is the system's ability to accept secondary input after a counterparty review.

System outputs may also include the production of machine executable instructions which are delivered to a specialized computer system wherein the machine readable instructions create a transformation in matter in the form of cut and printed panels and framing. The transformation in matter of the disclosed embodiments may include the cutting of panels with panels sometimes comprising bamboo products, the creating of blocking components 1000 that may be configured to be disposed between an outer panel and an inner panel. The novel integration between construction plans generated and execution of the plans by CNC machines, sometimes specially purposed, creates panels ready for onsite assembly.

Figure 3:
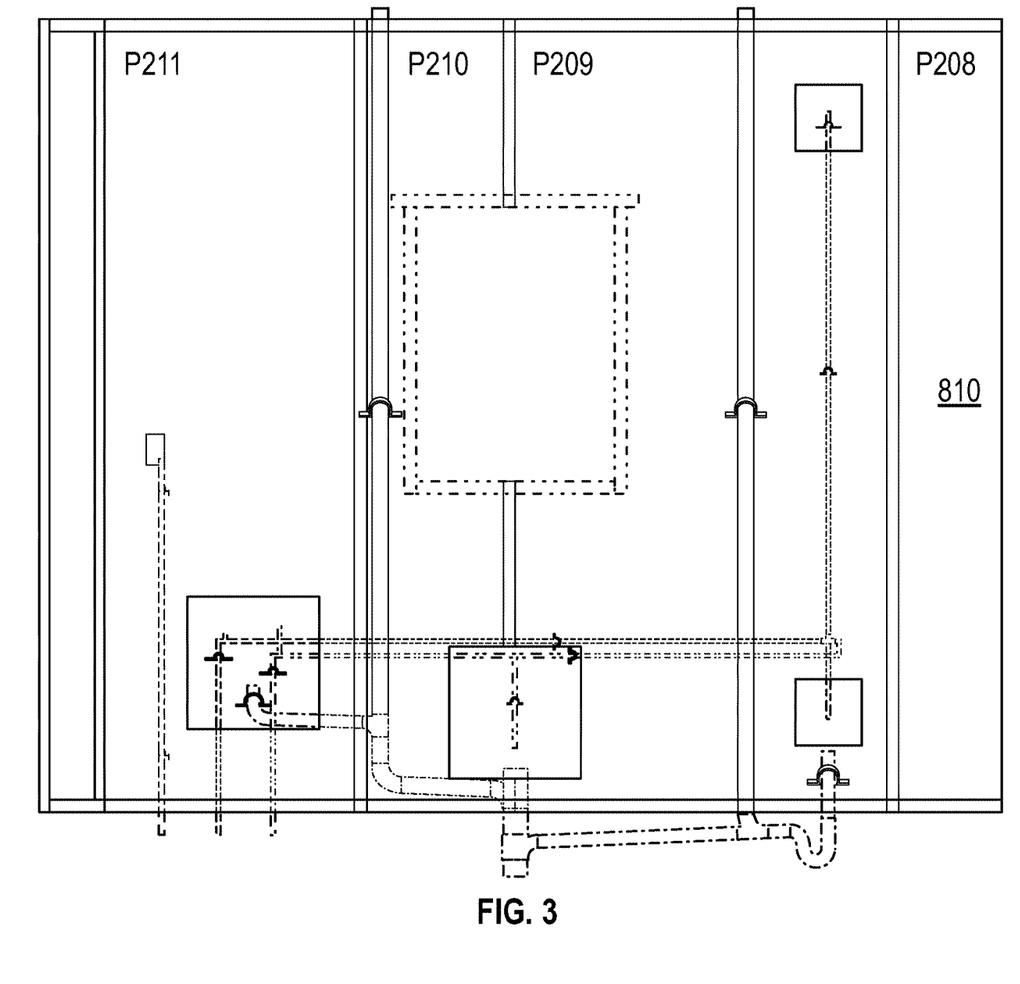
FIG. 3 depicts a panel marked and cut

FIG. 3 depicts markings or indica for construction components that may be disposed between an outside and inside panel. In some of the disclosed embodiments, construction components that reside upon or are attached upon a panel, often the exterior panel, are guided by the use of solid line indica. To avoid labors from drilling or nailing through an interior panel into a building component, components disposed behind the inner panel may be shown by use of dashed lines upon the inner surface or user facing surface of an inner panel. In some instances, interior wall components may be shown in solid lines printed upon the inner panel.

Figure 4:
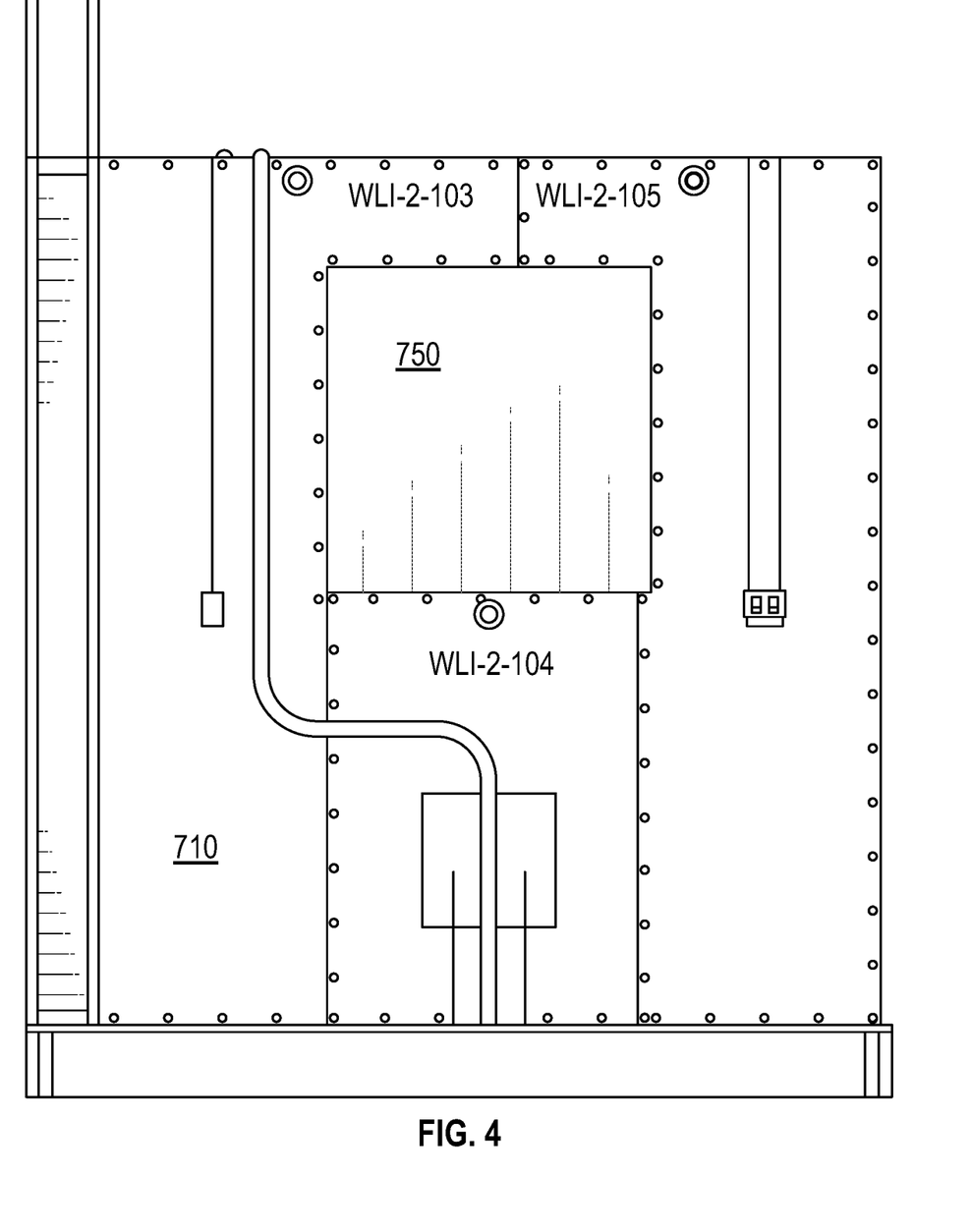
FIG. 4 depicts a panel marked and cut

FIG. 4 depicts an outer panel surface 710 with system designed and system printed component indicia. Such indica may include the illustrated electrical outlet and light switch with their respective electrical wiring. The upper portions of the drawing and portion just below the window void 750 comprise circular indicia that denote circular voids that may be used for blown in insulation and/or inspection ports.

Figure 5:
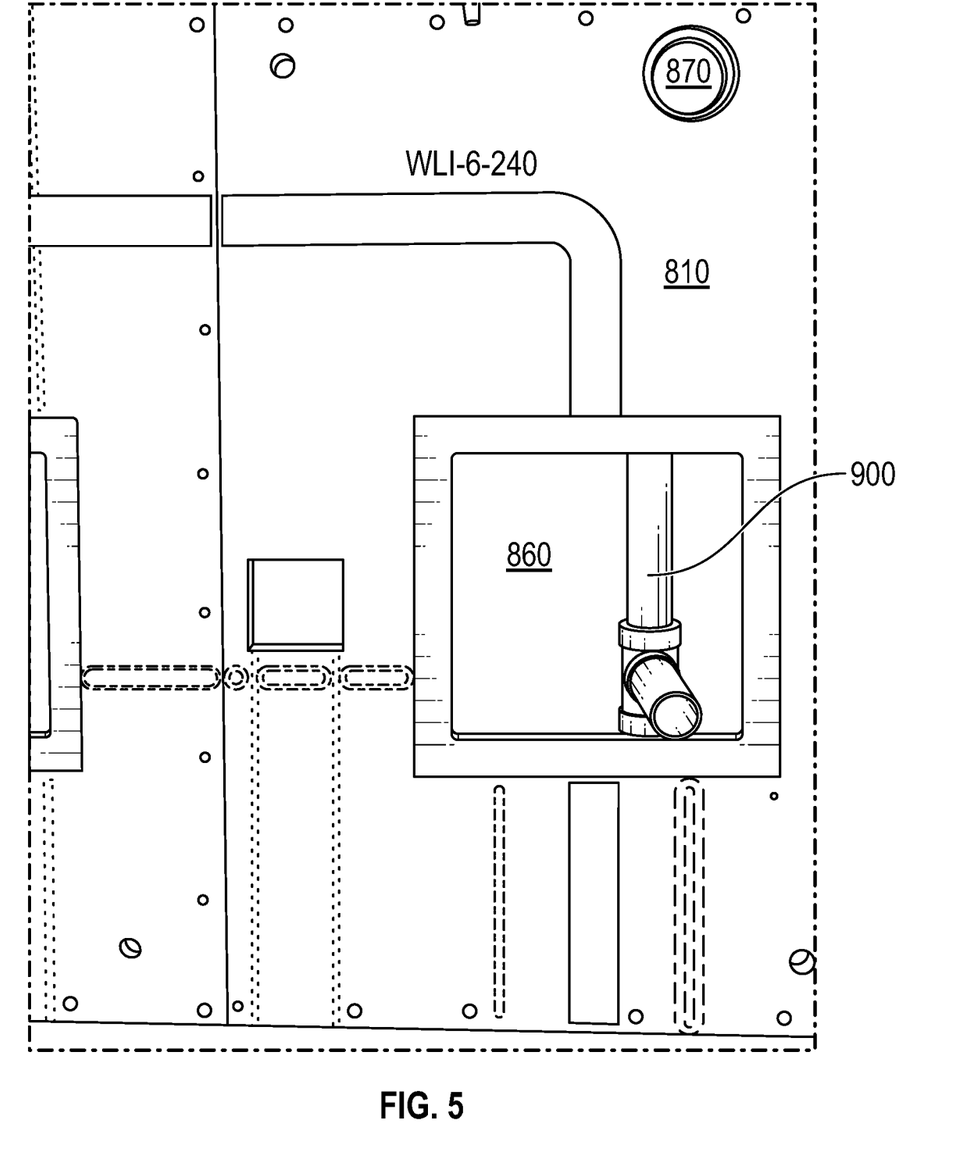
FIG. 5 depicts a panel marked, cut and used with a plumbing component

FIG. 5 depicts an insulation fill void 870 and a plumbing components 900 disposed between an exterior and interior panel and a plumbing void 860, defined by an inner panel.

Figure 6:
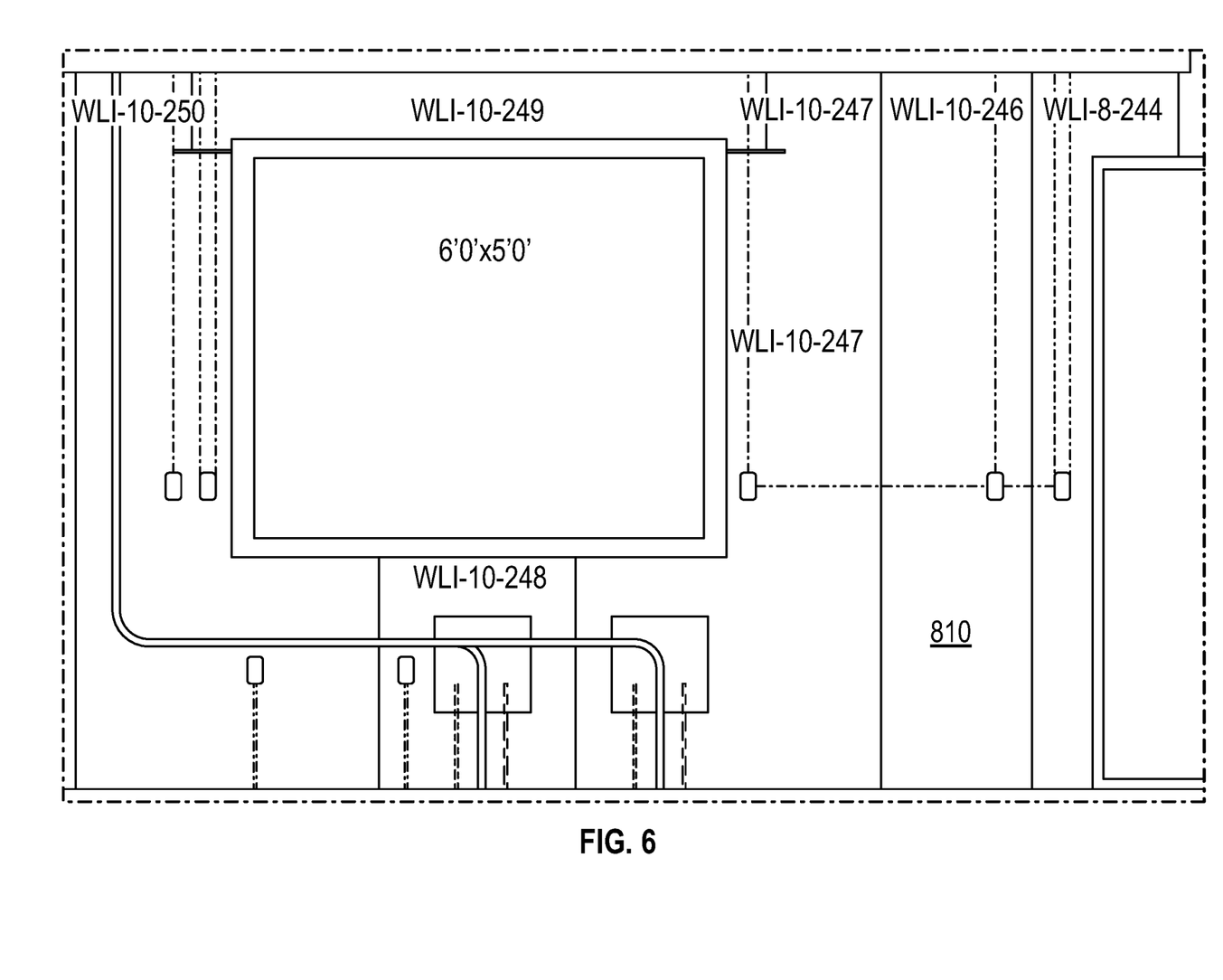
FIG. 6 depicts a panel marked, cut and marked

FIG. 6 depicts a plurality of interior panels and the use of both solid and dashed line indicia.

Figure 7:
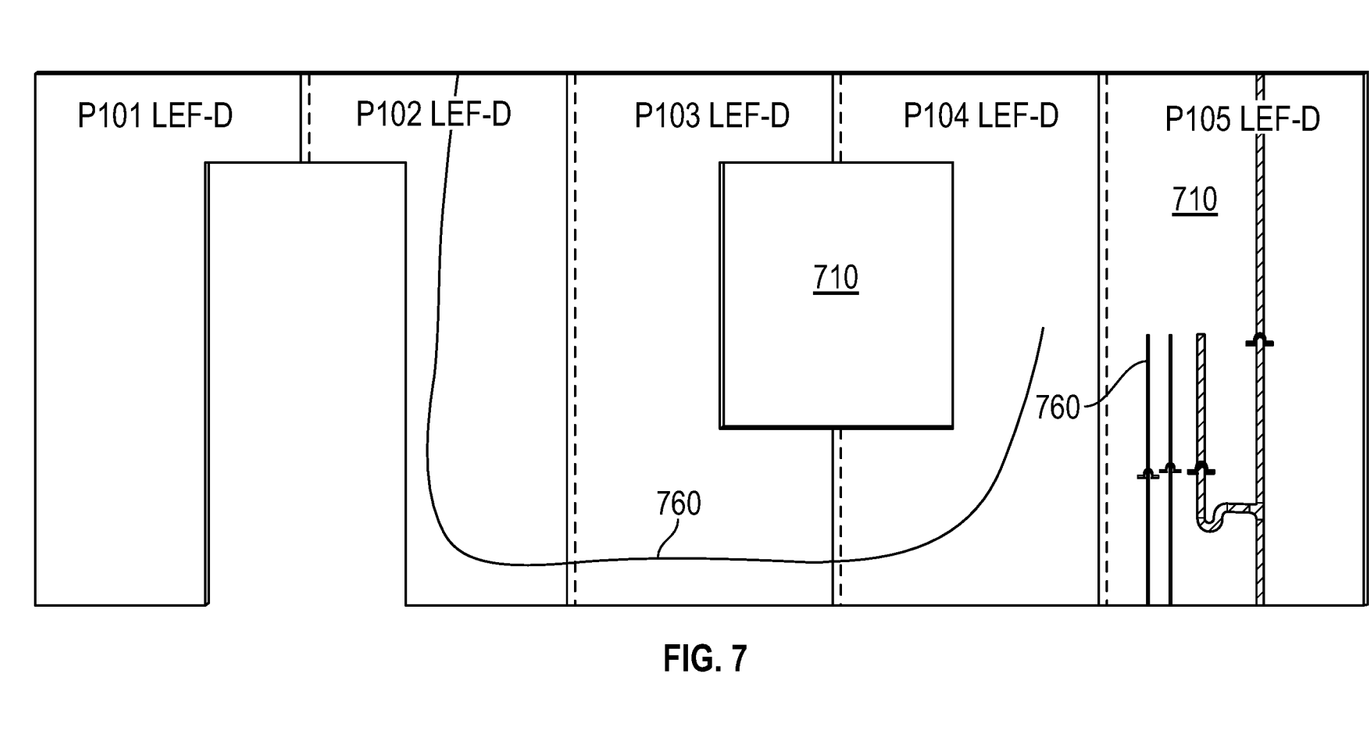
FIG. 7 depicts a panel marked, cut and marked

FIG. 7 depicts an exposed surface 710 of an outer panel comprising two lines 760 or sets of indica to note the placement of electrical line and plumbing to be attached to an outer panel.

Figure 8:
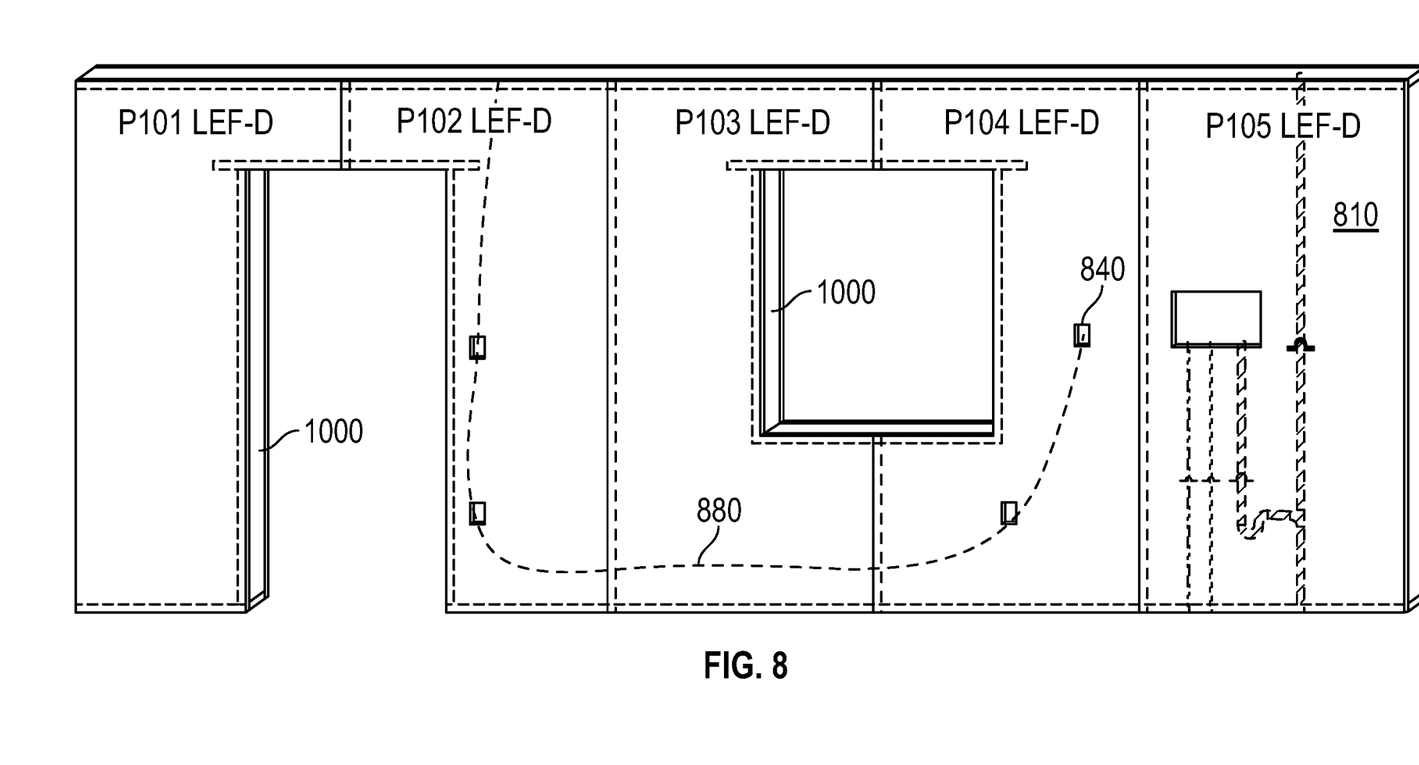

FIG. 8 depicts an inner panel placed over the outer panel of FIG. 7. FIG. 8 depicts dashed line 880 to note the placement of components attached to the exterior panel. FIG. 8 also depicts electrical outlet voids cut out over the interior electrical line. FIG. 8 also depicts a blocking component 1000 disposed at a door way and between an outer and inner panel. Blocking components are one of the many construction components designed and fabricated by the disclosed embodiments.

Panel Stiffeners

The disclosed systems also overcome shortfalls in the related art by specifying and providing wall stiffeners that do not run continuously from a mudsill to a top plate which is in contraction to the related art. The wall or panel stiffeners may be disposed in a vertical orientation, may be secured to both outer and inner panels and the panel stiffeners reduce deflection of the panels while defining interior voids used for accepting horizontal placement of electrical wire, plumbing and other components contained between the studless walls. The disclosed embodiments provide an improvement to studless wall construction by the machine design, machine construction panel stiffeners that reduce panel defection while supporting the horizontal disposition of electrical wire and plumbing without onsite cutting and while facilitating the unimpeded application of blown in insulation. Panel stiffeners may be comprised of bamboo products.

The disclosed embodiments overcome shortfalls in the art by the automated design and cutting of insulation fill voids 870, see FIG. 5 that facilitate the use of blown in insulation, avoiding the labor expense of stapling insulation in place, as performed in the prior art of traditional wall stud construction.

Various figures depict an exterior wall instantiation for ease of illustration. But, the disclosed embodiments are equally applicable and useful with interior walls without the inside/outside panel run orientation.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. For example, while the example above was of an exterior dual panel wall system, equally valuable instantiations include interior wall systems, floor and subfloor systems and roof systems. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

The disclosed embodiments include the following items:

1. A system (100) of configuring and printing construction indicia upon planar surfaces, the system comprising:

construction plans (200) in communication with a computer system, the construction plans comprising plans for building component plans, the building component plans comprising plans for architecture, structural, plumbing, electrical and mechanical;

the architectural and structural plans processed through a framing rules module (220) the output from the framing rules module further processed through a framing design and plan module (240) to produce a preliminary framing map module (410);

the plans for plumbing, electrical and mechanical processed through a subset construction data module (300) to produce a preliminary MEPI map module (430); and the preliminary MEPI map module and the preliminary framing map module processed through a conflict resolution module to produce outputs of floor plans, wall sections, panel cut sections and wall layout plans with the produced outputs used as inputs to a CNC cutter/printer (600) to cut and print upon panels and framing.

2. The system of item 1 further comprising a counterparty review module (470) processing output from the preliminary MEPI map module and the preliminary framing map module to produce final plan output (500) with the final plan output used as input to the CNC cutter/printer.

3. The system of item 1 wherein the output from the preliminary MEPI map module and the preliminary framing map module is converted to machine executable language 510 before being used as input to the CNC cutter/printer.

4. The system of item 2 further including the input of panel feed stock and framing feed stock into the CNC cutter/printer to cut and print upon panels and framing.

5. The system of item 2 further comprising the automated design and CNC cutting of blocking components configured to be disposed between an exterior panel and an interior panel.

6. The system of item 2 further configured for the automated design and cutting of panel stiffeners configured to be disposed between an exterior panel and an interior panel.

7. The system of item 2 further configured to place construction components and insulation voids such that blown in insulation will not be impeded by construction components disposed between an exterior panel and an interior panel.

What is claimed is:

1. A system of configuring and printing construction indicia upon planar surfaces on an interior panel and an exterior panel for producing hollow wall constructions, the system comprising: a computer system, one or more databases, a CNC cutter/printer and a communication network;

wherein the one or more databases comprises construction plans having building component plans for architecture, structural, plumbing, electrical and mechanical;

wherein the computer system is configured to refine a pre-plan stored in the one or more databases and to process the pre-plan using the user-defined inputs to produce a final plan output, the system being configured to:

a) receive the construction plans from the one or more databases, the construction plans comprising plans for building component plans, the building component plans comprising plans for architecture, structural, plumbing, electrical and mechanical;

b) process the architectural and structural plans through a framing rules module;

c) process an output of the framing rules module through a framing design and plan module to produce a preliminary framing map module;

d) process the plans for plumbing, electrical and mechanical through a subset construction data module to produce a preliminary Mechanical, Electrical and Plumbing, (MEPI) map module;

e) process the preliminary MEPI map module and the preliminary framing map module through a conflict and clash resolution module to produce outputs of floor plans, wall sections, panel cut sections and track plans;

f) transmit the produced outputs of the conflict and clash resolution module to a counterparty review module to produce the final plan output, wherein the system is configured to accept a secondary input after a counterparty review; and g) automatically produce cut and printed panels as per the final plan output of the counterparty review module for floor plans, wall sections, panel cut sections and track plans using a CNC cutter/printer machine; and wherein an automated design and cutting of panel stiffeners configured to be disposed between the exterior panel and the interior panel, the panel stiffener configured to reduce deflection between the exterior panel and the interior panel while providing interior voids.

2. The system of claim 1, wherein the system is configured to convert the output from the preliminary MEPI map module and the preliminary framing map module to machine executable language before being used as input to the CNC cutter/printer.

3. The system of claim further comprising the input of panel feed stock in the CNC cutter/printer to cut and print upon the panels.

4. The system of claim 3, further comprising the automated design and CNC cutting of blocking components configured to be disposed between an exterior panel and an interior panel.

5. The system of claim 1, further configured to place the construction components and insulation voids defined within the panels, such that blown in insulation will not be impeded by construction components disposed between an exterior panel and an interior panel.

6. The system of claim 1, wherein the CNC cutter/printer cuts the panel feed stock to include window voids.

7. The system of claim 1, further comprising the design and cutting of wall layout components.

8. A method of configuring and printing construction indicia upon planar surfaces on an interior panel and an exterior panel for producing hollow wall constructions, the method being performed by a computer system, the computer system being in communication with one or more databases, the method comprising:

a) receiving construction plans from the one or more databases, the construction plans comprising plans for building component plans, the building component plans comprising plans for architecture, structural, plumbing, electrical and mechanical;

b) processing the architectural and structural plans, through a framing rules module;

c) processing an output of the framing rules module through a framing design and plan module for producing a preliminary framing map module;

d) processing the plans for plumbing, electrical and mechanical through a subset construction data module for producing a preliminary Mechanical, Electrical and Plumbing (MEPI) map module;

e) processing the preliminary MEPI map module and the preliminary framing map module through a conflict and clash resolution module to produce outputs of floor plans, wall sections, panel cut sections and track plans;

f) transmitting the produced outputs of the conflict and clash resolution module to a counterparty review module to produce a final plan output, wherein the method further comprises accepting a secondary input after a counterparty review; and, g) automatically producing cut and printed panels as per the final plan output of the counterparty review module for floor plans, wall sections, panel cut sections and track plans using a CNC cutter/printer machine; and, wherein an automated design and cutting of panel stiffeners configured to be disposed between the exterior panel and the interior panel, the panel stiffener configured to reduce deflection between the exterior panel and the interior panel while providing interior voids.

9. The method of claim 8, comprising converting the output from the preliminary MEPI map module and the preliminary framing map module to machine executable language before being used as input to the CNC cutter/printer.

10. The method of claim 8, comprising providing panels from panel feed stock to the CNC cutter/printer machine to cut and print upon the panels.

11. The method of claim 10, comprising disposing the automated design and CNC cutting of blocking components between an exterior panel and an interior panel.

12. The method of claim 8, comprising placing construction components and insulation voids within the panels such that blown in insulation is not impeded by construction components disposed between the exterior panel and the interior panel.

13. The method of claim 8, wherein the CNC cutter/printer machine is configured to cut the panel feed stock to include window voids.

14. The method of claim 8, comprising including the design and cutting of wall layout components.

* * * * *